(12) United States Patent
Aldridge et al.

(10) Patent No.: US 8,285,984 B2
(45) Date of Patent: Oct. 9, 2012

(54) SECURE NETWORK EXTENSION DEVICE AND METHOD

(75) Inventors: Hal A. Aldridge, Tampa, FL (US); Keith R. Thal, Tampa, FL (US)

(73) Assignee: Sypris Electronics, LLC, Tampa, FL (US)

( * ) Notice: Subject to any disclaimer, the term of this patent is extended or adjusted under 35 U.S.C. 154(b) by 344 days.

(21) Appl. No.: 12/845,738

(22) Filed: Jul. 29, 2010

(65) Prior Publication Data

US 2012/0030459 A1 Feb. 2, 2012

(51) Int. Cl.
*H04L 29/06* (2006.01)
(52) U.S. Cl. ........................................... 713/153
(58) Field of Classification Search .................... 713/153
See application file for complete search history.

(56) References Cited

U.S. PATENT DOCUMENTS

| | | | |
|---|---|---|---|
| 7,254,707 B2 | 8/2007 | Herbert et al. | 713/164 |
| 7,444,415 B1 * | 10/2008 | Bazzinotti et al. | 709/229 |
| 7,444,601 B2 | 10/2008 | Proudler et al. | 716/1 |
| 7,526,785 B1 | 4/2009 | Pearson et al. | 725/31 |
| 7,529,180 B1 | 5/2009 | Karl et al. | 370/216 |
| 7,552,328 B2 | 6/2009 | Wray | 713/166 |
| 7,568,225 B2 | 7/2009 | Wang et al. | 726/17 |
| 7,600,261 B2 | 10/2009 | Wray | 726/26 |
| 7,694,139 B2 | 4/2010 | Nachenberg et al. | 713/170 |
| 7,707,457 B2 | 4/2010 | Marchand | 714/18 |
| 7,849,267 B2 * | 12/2010 | Lam et al. | 711/115 |
| 2006/0047776 A1 | 3/2006 | Chieng et al. | 709/217 |
| 2007/0256139 A1 | 11/2007 | Gaos et al. | 726/26 |
| 2010/0057789 A1 | 3/2010 | Kawaguchi | 707/204 |
| 2010/0097925 A1 | 4/2010 | Bell | 370/219 |
| 2010/0197272 A1 * | 8/2010 | Karaoguz et al. | 455/411 |
| 2011/0280572 A1 * | 11/2011 | Vobbilisetty et al. | 398/45 |

* cited by examiner

*Primary Examiner* — Michael S McNally
(74) *Attorney, Agent, or Firm* — Law Office of Thomas J. Brindisi

(57) ABSTRACT

A network extension device comprising a CPU, memory, protected I/O connectable to local controls and peripherals, external communications port, a trusted device connected to the CPU such that it can provide attestation of the network extension device's trusted operation to a connected known external network, and a protected interface connected to at least one network extension module that includes a local network communications port. Optionally, a traffic encryption module may be provided, and the trusted device's attestation may include a check of its operation. Also, a method comprising connecting the network extension device to an external network, performing an operating mode check, causing the network extension device to operate in a mode and perform a security check that correspond to the result, causing the trusted device to attest trusted operation to the external network and thereafter causing the CPU to function fully and permitting access to the external network.

39 Claims, 2 Drawing Sheets

SECURE NETWORK EXTENSION DEVICE AND METHOD

FIELD OF THE INVENTION

The present invention relates to computing networks in general and, in particular, to a secure network extension device and method.

BACKGROUND

Enterprise networks are commonly overseen at remote sites by an Information Technology (IT) administrator placed on-site to deploy and maintain the remote network's functionality, availability, and security. Means of remotely administering network functionality and availability are known, but they do not handle security adequately to maintain the posture required for high value information systems without local security administration. Assigning IT administrator resources to remote sites presents a significant cost, and security depends greatly on the particular administrator's expertise and prioritization of security. This issue can be pronounced for some organizations (e.g., DoD, Financial, Medical, Government) that may need significant networked resources at remote sites, but require high network security and data confidentiality; the issue is compounded where the remote sites may be prone to degradation, reduction, or loss of network communications.

SUMMARY OF THE INVENTION

The present invention permits robust centralized IT administration of remote network extensions from the central enterprise network, through means including the attestation of trusted operation, allowing personnel at a remote location to operate securely. A network extension device according to an embodiment of the present invention may comprise a CPU, a memory connected to the CPU, a protected I/O connected to the CPU and connectable to one or more local controls and to one or more local peripherals, an external communications port connected to the CPU and connectable to a known external network, a trusted device connected to the CPU such that the trusted device can provide attestation of trusted operation of the network extension device to a known external network to which the external communications port is connected, and a protected interface connected to the CPU and to at least one network extension module that includes a local network communications port. In a preferred embodiment, a traffic encryption module is also connected to the CPU and to the trusted device such that the trusted device can communicate attestation of trusted operation of the traffic encryption module to a connected known external network, such as with the trusted device checking the traffic encryption module's encryption algorithm. The network extension device's communications and security functions may be embodied within a single module (e.g., a trusted controller module) to further enhance security and remote verifiability, and the network extension device also may include tamper-proofing such as sensors.

A method of secure computing using a network extension device according to an embodiment of the present invention comprises providing a network extension device (having a CPU, a memory connected to the CPU, a protected I/O connected to the CPU and connectable to one or more local controls and one or more local peripherals, a trusted device connected to the CPU, and an external communications port connectable to a known external network, connecting the external communications port to the external network, after making the connection performing an operating mode check, after making the operating mode check causing the network extension device to operate in a mode corresponding to its results and performing a security check corresponding to its results, after making the connection causing the trusted device to attest the trusted operation of the network extension device to the external network, and after sending acceptable attestation causing the CPU to function fully and permitting the network extension device to access the external network. A high assurance level of trust for the remote site network (i.e., network extension) preferably is afforded throughout different modes of operation (e.g., different communication conditions such as full bandwidth, partial bandwidth, or no network connectivity), and different security checks may be performed depending on the mode of operation. In an embodiment adapted for modes that correspond to different levels of external network bandwidth, local (i.e., on the network extension device) backing up of data and/or execution of applications may be implemented during modes that are less than full bandwidth.

DETAILED DESCRIPTION OF EMBODIMENTS

Figure 1:
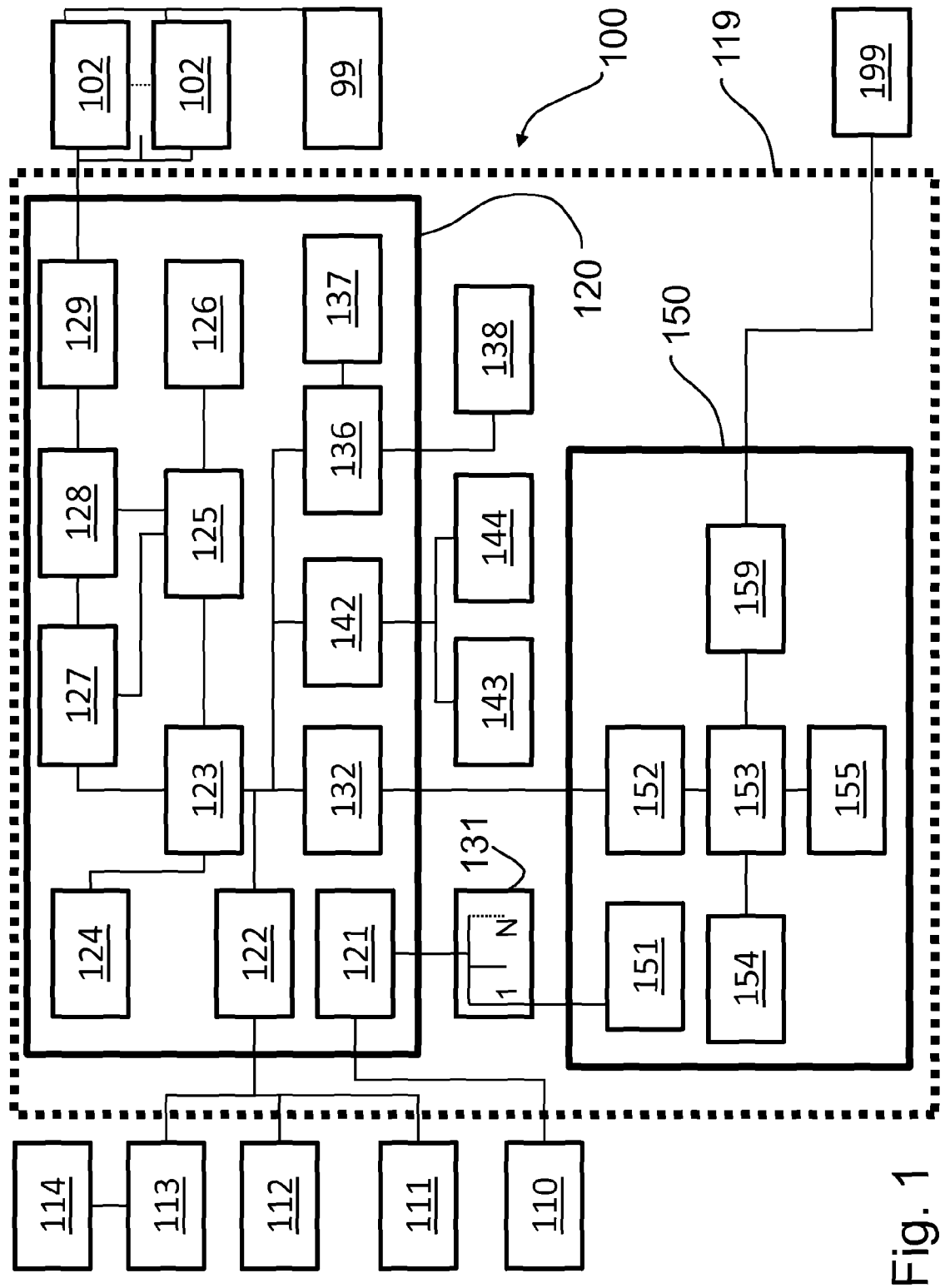
FIG. 1 is a block diagram of a network extension device according to an embodiment of the invention.

Referring to FIG. 1, a block diagram of a network extension device 100 according to an embodiment of the present invention is shown. In a preferred embodiment, the network extension device 100 is in a sealed enclosure that is physically secured by a tamper security boundary 119, and primarily comprises a trusted controller module 120 (embodied, e.g., on a printed circuit board) and one or more (N) network extension modules 150 (embodied, e.g., in commercial off-the-shelf servers such as the HP ProLiant® DL320 Generation 6 with Trusted Platform Module). The trusted controller module 120 receives power from power control 121, which can be connected to external power 110. Power control 121 then also controls network extension power 151, via power switch 131 to which network extension devices 100 are connected. Network extension module 150 includes a CPU 153, memory 154, a communication port 159, an input/output 152, and a trusted device 155. The trusted controller module 120 includes a CPU 123, memory 124, a protected interface 132, an input/output 142 connecting the module 120 to internal storage 143 (e.g., a hard drive) and other internal devices 144, a security monitor 136 connected to on-master security sensors 137 and internal security sensors 138, a trusted device 125 connected to a cryptographic key store 126, a traffic encryption module 127, a network security module 128, and a communication port 129. Communication port 129 can connect to an external network 99 such as through one or more (N) COM devices 102, and communication port 159 can connect to a local client network 199. In addition to controlling communication port 129, network security module 128 also may have switch and route control over communication port 159's local network connection. Encrypted communication with the local client network 199 (e.g., an office, temporary work site, etc.) may also be supported, preferably with any wires connecting to the communication port 159 being physically secured from tampering. Additionally, protected I/O 122 (which provides the trusted controller module 120 protection by only admitting authorized I/O, and checking the authorized I/O for viruses, malware, black/white list information, etc.) can connect to local peripheral devices 111, a local control 112 (e.g., a keyboard, mouse, etc.), and an out-of-band remote control 113 to which might be connected one or more COM devices 114 (of which the system would preferably require pre-configured credentials or the like that would have to be authenticated, e.g., by the external network 99, before a COM device 114 would be allowed to change settings etc.).

The trusted controller module 120 protects communications and ensures secure computing by utilizing the trusted device 125 to ensure that various functions are operating in a known configuration. In a preferred embodiment, the trusted controller module 120 provides network traffic encryption, network security, protected interfaces, security monitoring and control, communications failover, and general computing resources needed for the network extension, described further below. The number of network extension modules 150 may be scalable, to extend the general computing resources needed to support a larger client network extension.

The protected interface 132 buffers data passed into the trusted controller module 120 from the network extension module(s) 150, and is preferably a high-speed, low-level interface that can be configured to provide functions such as confirmation of message types, malware detection, and other facilities to preclude receiving data that might affect the security (e.g., modify security settings or protocols) of the trusted controller module 120 through the network extension module 150 from a local user or attached local network. Message type checking and malware detection could be based on multiple well-known techniques and software available from commercial vendors such as Symantec and McAfee.

Traffic encryption module 127 encrypts data traversing the network between the remote site (where the network extension device 100 is) and the enterprise network (external network 99), using algorithms and key management schemes chosen based on the application and the sensitivity of its data. In a preferred embodiment, the National Security Agency's Suite B cryptographic algorithms can be used, which include Advanced Encryption Standard (AES) used with the Galois/Counter Mode (GCM) for traffic encryption and Elliptic-Curve Diffie-Hellman (ECDH) key agreement. Optionally, the trusted controller module 120 can handle more than one level of encryption, such as in a secure sockets layer-encrypted browser session sent through a virtual private network.

The security monitor 136 controls the system's response to a perceived physical attack that may compromise the data and/or trust of the system, enhancing security as an additional layer of defense to network and application security mechanisms (which could otherwise be circumvented when physical access is granted to the hardware, e.g., by active probing, forced data remanence, and/or malicious hardware replacement). A tamper security boundary 119 can be provided with a sealed container housing the hardware and one or more internal sensors 138 and/or on-master sensors 137, such as tamper switches provided to detect access to the sealed container, active tamper wrappers around sensitive components, temperature monitors, and voltage detectors. If a breach is detected, the security monitor 136 can cause various responses including erasure of all sensitive unencrypted data and some security parameters that will prevent the system from operating until the appropriate security controls and initialization parameters have been restored by a trusted source.

The network security module 128 can include a firewall (e.g., with "white lists" of authorized network resources), intrusion detection and prevention system (e.g., a commercial IPS security appliance from a commercial vendor such as Juniper Networks or CISCO), and malware/antivirus system (e.g., off-the-shelf software from a commercial vendor such as Symantec), so that the network infrastructure, policies enforced (remotely) by the network administrator, and the trust of the network remain intact as deployed, preserving confidentiality, integrity, and availability of the network.

The trusted device 125 serves as the root of trust for the network extension device 100, with the trusted device 155 providing an additional layer of security (e.g., verifying the boot up sequence, and then monitoring the application stack of the network extension module 150 to ensure the configuration has not been altered from what is expected); each can be based on the trusted platform module (TPM) of the trusted computing standard developed by the Trusted Computing Group. The trusted device 125 manages cryptographic functions such as cryptographic key management, certificate validation (either directly or by monitoring the software that performs validation), and non-traffic-related encryption. An embodiment of these functions could be extensions of the cryptographic functions found with a trusted device 125 such as hashing and key generation. The trusted device 125 also preferably provides remote attestation, preferably including of traffic encryption operation (including the algorithm), which can be implemented similarly to the remote attestation taught by U.S. Pat. No. 7,254,707 to Herbert et al., the teachings of which are incorporated by reference. For example, information can be captured in an audit log for the trusted device 125, and then digitally signed and provided to the external network 99 via a protected communications path for attestation of the network extension device 100. The trusted device 125 can be paired with hardware-based trusted processor extensions (such as Intel's trusted execution technology) to create and verify processor environments that run only approved software and can be correctly measured to verify system properties, providing superior assurance of trust over software-based techniques. A remote control function, for example via an out-of-band remote control 113, could be enabled through a standard communications protocol (e.g., a later version of SNMP that provides facilities for confidentiality, message integrity, and authentication) that works with the trusted device 125 to verify that any remotely commanded configuration changes are executed correctly.

Figure 2:
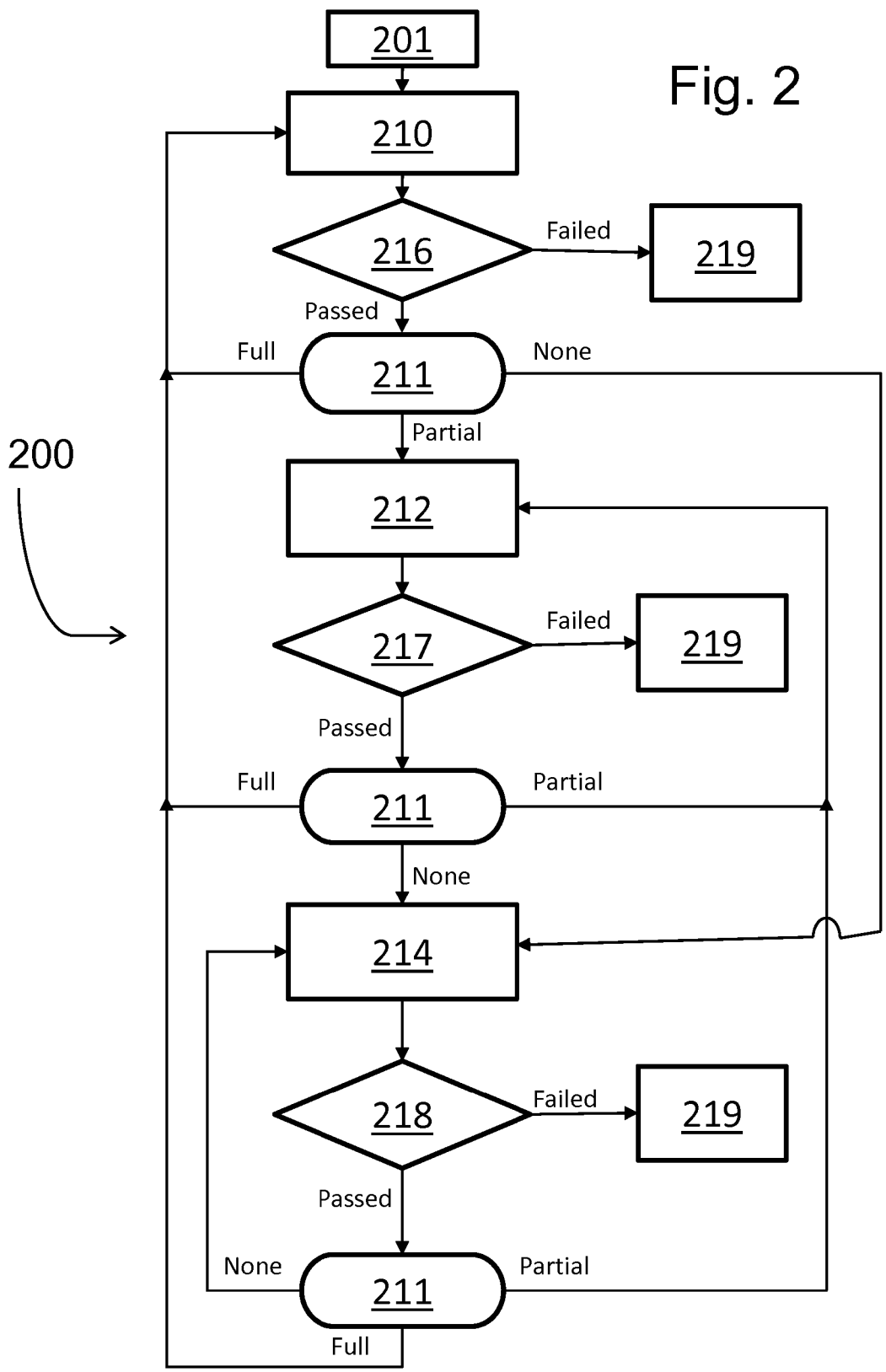
FIG. 2 is a flowchart of a process of communication failover according to an embodiment of the present invention.

In a preferred embodiment of the invention, the network extension device 100 can have its security attested to an external network 99 (which network is 'known,' such as by the trusted device 125 being deployed to the remote site with cryptographic information corresponding to the external network 99) throughout multiple operational modes, such as throughout differing levels of communicativity as is outlined in the flowchart of FIG. 2. (Instead of differing communicativity levels, other types of operational modes could be used in other embodiments; for example, the operational modes could be differing network architectures, such as client/server, thin client, standalone workstation, cloud computing). In such a communication failover process 200, trusted functionality of the network extension device 100 is retained even when communication is restricted (e.g., communication conditions degrade the bandwidth of a connection, or a reduced-bandwidth alternative communication mode is used) or lost. The process preferably automatically detects when failovers are necessary, and may be accompanied by one or more alternative modes of communication. Failover to POTS, satellite, etc., can be provided, such as with commercially available solutions by NETRIX including their Nx2200 series switches, and/or to a secondary interface using routing daemons such as disclosed in U.S. Patent Application Publication No. 2010/0097925 to Bell, such teachings of which are incorporated by reference.

With reference to FIG. 2, in such a failover process 200 the network extension device commences in full bandwidth mode 210 after startup 201, immediately performing a security check 216. (Preferably, data mirroring, which can utilize or be functionally similar to database software sold by several commercial vendors such as Microsoft and Oracle, also commences, preferably creating and maintaining a local copy of important data and applications that is complete enough to support subsequent operation in no bandwidth mode with at least a selected subset of applications. Various known failover computing and backup techniques can be employed as appropriate for a given embodiment, such as those taught in U.S. Pat. No. 7,707,457 to Marchand and U.S. Patent Application Publication No. 2010/0057789 to Kawaguchi, the disclosures of which in that regard are incorporated by reference.). Failure of the security check causes the network extension device 100 to enter recover mode 219 (whereupon an alert to the failure is provided, and depending on the perceived severity of the failure, an automated response to the failure may be initiated); otherwise, a bandwidth connectivity check 211 is performed to determine if full, partial, or no bandwidth communication is present (e.g., 'full' if the bandwidth is sufficient for the external network 99 to perform the computational processing required for the nodes connected to the network extension device 100 to operate as thin clients, 'partial' if the bandwidth tests at a level falling below support for thin client processing but sufficient to allow the network extension device 100 to process the applications while the data is exchanged with the external network 99, and 'no' for a bandwidth that tests below a threshold to support even shared computational processing). The outcome at that step causes the network extension device 100 to enter the associated bandwidth mode (i.e., full bandwidth mode 210, partial bandwidth mode 212, no bandwidth mode 214) and then perform another security check 216, 217, or 218, and so on. In partial bandwidth mode 212, the network extension device 100 performs a security check 217, which if passed leads to a bandwidth connectivity check 211. The outcome of the check again causes the network extension device 100 to enter the associated resultant bandwidth mode of the bandwidth connectivity check 212. This same cycle is repeated when the network extension device 100 is in no bandwidth mode 214, but with security check 218.

In a preferred embodiment, the trusted device 125 changes what is monitored depending on the mode of communication. In full bandwidth mode 210, the trusted device 125 performs security check 216 and monitors the functions that provide access to network applications and data that reside on the external network 99 for unauthorized changes (and also, e.g., for inappropriately addressed TCP/IP data packets when compared to the "white list" of approved recipients). In a 'thin client embodiment,' network extension module 150 preferably just passes data through without any significant processing during full bandwidth mode 210.

After a communications failover to partial bandwidth mode 212, local hosting of processing begins (preferably based on data mirrored during full bandwidth mode 210) such as running the web browser server locally (optionally, 'locked down') on the network extension module 150 (preferably using a secure system virtual machine), to leave the restricted communications bandwidth more available for data transport. The trusted device 125 preferably adapts its monitoring techniques and security check 217 to incorporate the adjusted operation of the network extension device 100. In addition to monitoring the web browser server, the protocol of communications may be changed resulting in a different method by which monitoring must take place.

Finally, in the no bandwidth mode 214, all applications and data are retained and executed locally until connectivity is re-established back to the external network 99. (In this embodiment, that is the most complex local computing allowed by the architecture and system-enforced policy, and is specified to be within the monitoring capability of the trusted device 125). The techniques of monitoring and security check 218 by the trusted device 125 are preferably adapted to allow trust of the network extension device 100 to be retained and then attested back to the external network 99 when connectivity is restored. (Preferably, local mirror and external databases are re-synchronized if and when network connectivity is restored).

One skilled in the art will appreciate that other variations, modifications, and applications are also within the scope of the present invention. Thus, the foregoing detailed description is not intended to limit the invention in any way, which is limited only by the following claims and their legal equivalents.

What is claimed is:

1. A network extension device for use with a known external network, the device comprising:
   a. a master CPU;
   b. a master memory connected to the master CPU;
   c. a protected I/O connected to the master CPU and connectable to one or more local controls and to one or more local peripherals;
   d. an external communications port connected to the master CPU and connectable to a known external network;
   e. a master trusted device connected to the master CPU such that the master trusted device can provide attestation of trusted operation of the network extension device to a known external network when the external communications port is connected thereto;
   f. a protected interface connected to the master CPU;
   g. at least one network extension module connected to the protected interface and including a local network communications port; and
   h. a traffic encryption module connected to the master CPU and to the master trusted device such that the master trusted device can communicate attestation of trusted operation of the traffic encryption module to a known external network when the external communications port is connected thereto.

2. The network extension device of claim 1, wherein the traffic encryption module employs an encryption algorithm and the network extension device is configured such that the master trusted device can perform a check on the encryption algorithm.

3. The network extension device of claim 2, wherein the master trusted device is capable of allowing trust of the network extension device to be retained when the network device is effectively disconnected from and then reconnected to the known external network.

4. The network extension device of claim 1, wherein connection of the external communications port to the known external port can be full or restricted, and the master trusted device is capable of performing a first security check when the connection of the external communications port to the known external port is full, and a second security check when the connection of the external communications port to the known external network is restricted.

5. The network extension device of claim 4, wherein the master trusted device is capable of allowing trust of the network extension device to be retained when the network device is effectively disconnected from and then reconnected to the known external network.

6. The network extension device of claim 1, wherein connection of the external communications port to the known external port can be full or restricted, and the master trusted device is capable of performing a first security check when the connection of the external communications port to the known external port is full, and a second security check when the connection of the external communications port to the known external network is restricted.

7. The network extension device of claim 1, wherein the master trusted device is capable of allowing trust of the network extension device to be retained when the network device is effectively disconnected from and then reconnected to the known external network.

8. The network extension device of claim 1, wherein the network extension device is a standalone hardware unit having a tamper security boundary.

9. The network extension device of claim 8, wherein the master CPU, master memory, protected I/O, external communications port, and master trusted device are part of a trusted controller module embodied on a printed circuit board within the standalone hardware unit.

10. The network extension device of claim 9, wherein the trusted controller module further comprises a security monitor module, and wherein one or more security sensors is connected to the security monitor module.

11. The network extension device of claim 1, further comprising a network security module connected to the external communications port and to the master trusted device such that the master trusted device can communicate attestation of trusted operation of the network security module to a known external network when the external communications port is connected thereto.

12. The network extension device of claim 11, further comprising a traffic encryption module connected to the master CPU and to the master trusted device such that the master trusted device can communicate attestation of trusted operation of the traffic encryption module to a known external network when the external communications port is connected thereto.

13. The network extension device of claim 1, wherein each at least one network extension module further comprises an extension module CPU connected to the local network communications port, an extension module memory connected to the extension module CPU, an extension module I/O connected to the extension module CPU and to the protected interface, and an extension module trusted device connected to the extension module CPU.

14. The network extension device of claim 13, wherein the network extension device is a standalone hardware unit having a tamper security boundary.

15. The network extension device of claim 14, wherein the master CPU, master memory, protected I/O, external communications port, and master trusted device are part of a trusted controller module embodied on a printed circuit board within the standalone hardware unit.

16. The network extension device of claim 15, wherein the trusted controller module further comprises a security monitor module, and wherein one or more security sensors is connected to the security monitor module.

17. The network extension device of claim 14, further comprising a security monitor module, and one or more security sensors connected to the security monitor module.

18. The network extension device of claim 1, wherein the protected I/O is capable of connecting to a remote control that can issue configuration change commands, and wherein the master trusted device is capable of verifying that any configuration changes commanded via the remote control are executed correctly.

19. A method of secure computing using a network extension device, comprising the following steps:
 a. providing an external network;
 b. providing a network extension device having a master CPU, a master memory connected to the master CPU, a protected I/O connected to the master CPU and connectable to one or more local controls and one or more local peripherals, a master trusted device connected to the master CPU, and an external communications port connectable to the external network, wherein the network extension device is known to the external network;
 c. connecting the external communications port of the network extension device to the external network;
 d. after step c, performing an operating mode check;
 e. after step d, causing the network extension device to operate in a mode corresponding to the results of the operating mode check, and performing a security check corresponding to the results of the operating mode check;
 f. after step c, causing the master trusted device to attest the trusted operation of the network extension device to the external network;
 g. in response to receipt by the external network of proper attestation from the trusted device of trusted operation of the network extension device as a result of step f, causing the CPU to function fully, and permitting the network extension device to access the external network; and
 h. wherein the network extension device further comprises a traffic encryption module that employs an encryption algorithm and is connected to the master CPU and to the master trusted device, and wherein step f includes a check on the encryption algorithm.

20. The method of claim 19, wherein the operating mode check is a connectivity check.

21. The method of claim 20, wherein the connectivity check is a bandwidth check.

22. The method of claim 21, wherein the bandwidth check includes the possible results of no bandwidth, partial bandwidth, or full bandwidth.

23. The method of claim 22, further comprising the step of causing the network extension device to operate in a full bandwidth mode, a partial bandwidth mode, or a no bandwidth mode, depending on the results of the bandwidth check.

24. The method of claim 23, further comprising the step of causing the master trusted device to perform a first security check if the result of the bandwidth check is full bandwidth mode, a second security check if the result of the bandwidth check is partial bandwidth mode, and a third security check if the result of the bandwidth check is no bandwidth mode.

25. The method of claim 24, further comprising the step of causing the master trusted device to provide attestation of trusted operation of the network extension device to the external network if the connection between the network device and the external network has been recovered after having been restricted or lost.

26. The method of claim 25, further comprising the step of backing up data on the network extension device and/or running applications on the network extension device.

27. The method of claim 26, further comprising the step of, during any restricted or lost connection between the network device and external network, maintaining functional security of the network extension device and maintaining integrity of data backed-up on the network extension device.

28. The method of claim 27, further comprising the step of, after any restricted or lost connection between the network extension device and the external network is recovered, reconstituting data on the external network from data on the network extension device.

29. The method of claim 19, further comprising the step of causing the master trusted device to provide attestation of trusted operation of the network extension device to the external network if the connection between the network device and the external network has been recovered after having been restricted or lost.

30. The method of claim 29, wherein the network extension device further comprises a traffic encryption module that employs an encryption algorithm and is connected to the master CPU and to the master trusted device, and wherein step f includes a check on the encryption algorithm.

31. The method of claim 30, further comprising the step of backing up data on the network extension device and/or running applications on the network extension device.

32. The method of claim 31, further comprising the step of, during any restricted or lost connection between the network device and external network, maintaining functional security of the network extension device and maintaining integrity of data backed-up on the network extension device.

33. The method of claim 32, further comprising the step of, after any restricted or lost connection between the network extension device and the external network is recovered, reconstituting data on the external network from data on the network extension device.

34. The method of claim 29, further comprising the step of backing up data on the network extension device and/or running applications on the network extension device.

35. The method of claim 34, further comprising the step of, during any restricted or lost connection between the network device and external network, maintaining functional security of the network extension device and maintaining integrity of data backed-up on the network extension device.

36. The method of claim 35, further comprising the step of, after any restricted or lost connection between the network extension device and the external network is recovered, reconstituting data on the external network from data on the network extension device.

37. The method of claim 19, wherein the network extension device is a standalone hardware unit having a tamper security boundary.

38. The method of claim 37, wherein the master CPU, master memory, protected I/O, external communications port, and master trusted device are part of a trusted controller module embodied on a printed circuit board within the standalone hardware unit.

39. The method of claim 38, wherein the trusted controller module further comprises a security monitor module, and wherein one or more security sensors is connected to the security monitor module.

* * * * *